United States Patent
Stewart et al.

(10) Patent No.: US 6,808,672 B2
(45) Date of Patent: Oct. 26, 2004

(54) PROCESS AND APPARATUS FOR COAGULATING AND DRYING LATEX

(75) Inventors: Robert Michael Stewart, Selangor Darul Ehgan (MY); Chan Pak Kuen, Selangor Darul Ehgan (MY); Ralph Nicholas Spearman, Selangor Darul Ehgan (MY); Norhisham MD Sanusi, Selangor Darul Ehgan (MY); David William Fountain, Selangor Darul Ehgan (MY)

(73) Assignee: Linatex Rubber Products SDN BHD, Batu Caves (MY)

( * ) Notice: Subject to any disclaimer, the term of this patent is extended or adjusted under 35 U.S.C. 154(b) by 152 days.

(21) Appl. No.: 09/940,494

(22) Filed: Aug. 29, 2001

(65) Prior Publication Data

US 2003/0105181 A1 Jun. 5, 2003

(Under 37 CFR 1.47)

(30) Foreign Application Priority Data

Aug. 29, 2000 (MY) .................................... PI 2000 3975

(51) Int. Cl.[7] ................................................. H05B 6/64
(52) U.S. Cl. ......................... 264/489; 521/64; 521/65; 524/800; 528/502 R; 528/936
(58) Field of Search ............................ 264/489; 521/65, 521/64; 524/800; 528/502 R, 936; 522/86

(56) References Cited

U.S. PATENT DOCUMENTS

| 3,771,234 | A | * | 11/1973 | Forster et al. ................. 34/259 |
| 4,303,569 | A | * | 12/1981 | Giiurak et al. ............... 528/487 |
| 4,391,765 | A | * | 7/1983 | Lee et al. .................... 264/418 |
| 4,499,036 | A | * | 2/1985 | Hawkes, Jr. ................. 264/420 |
| 4,566,804 | A | * | 1/1986 | Collins et al. ................. 374/14 |
| 6,299,808 | B1 | * | 10/2001 | Mork et al. ................. 264/46.1 |
| 6,346,557 | B1 | * | 2/2002 | Argy et al. .................... 521/71 |

FOREIGN PATENT DOCUMENTS

| EP | 1184148 A2 | * | 3/2002 |
| GB | 1226988 | * | 3/1971 |

* cited by examiner

*Primary Examiner*—Susan Berman
(74) *Attorney, Agent, or Firm*—Michael J. Cronin

(57) ABSTRACT

A process for the continuous coagulation and drying of rubber latex includes feeding the latex onto an endless conveyor belt which feeds the latex through a coagulator. A combination of microwave energy and hot air raises the temperature of the latex causing it to coagulate in a coagulation time of less than five minutes. The coagulated rubber from the coagulator is fed into a conveyor belt of a stretch unit which stretches the rubber by increasing its speed of travel. The stretched rubber is then conveyed onto the upper belt of a drying unit. The drying rubber is passed from the upper belt onto an intermediate belt and then on to a lower belt before leaving the drying unit. A combination of microwave energy and hot air in the drying unit is used to dry the rubber to a moisture content of less than 1.5%.

8 Claims, 1 Drawing Sheet

PROCESS AND APPARATUS FOR COAGULATING AND DRYING LATEX

BACKGROUND OF THE INVENTION

This application claims the priority of Malaysian patent document PI 2000 3975, filed Aug. 29, 2000, the disclosure of which is expressly incorporated by reference herein.

The present invention relates to a process and apparatus for the continuous coagulation and drying of a rubber latex. In the specification the term "rubber latex" includes both a natural rubber latex and synthetic rubber latices.

There has previously been proposed and developed a process in which a rubber latex is fed through a coagulator in which the temperature of the latex is raised sufficiently to cause the latex to coagulate to form coagulated rubber. The coagulated rubber is then fed through a dryer which reduces the moisture content of the coagulated rubber to an acceptable level.

In the above-mentioned conventional process, the coagulation of the rubber latex can take several hours, and the drying process can take more than 15 hours.

SUMMARY OF THE INVENTION

It is an object of the invention to provide a process and apparatus for the continuous coagulation and drying of rubber latex in which the above-mentioned coagulation and drying times are reduced and there is a more precise control of the coagulation and drying process.

According to one aspect of the invention there is provided a process for the continuous coagulation and drying of rubber latex in which at stream of the latex is passed through a coagulator to form coagulated rubber. The coagulated rubber stream from the coagulator is introduced into a dryer downstream of the coagulator, and the coagulated rubber is passed through the dryer to dry the rubber. The latex stream in the coagulator is heated by a combination of microwave energy and hot air to cause the latex to coagulate.

The coagulation temperature may be in the range from 30° C. to 90° C., and preferably the latex stream entering the coagulator may have a thickness in the range from 1.0 mm to 15. 0mm.

The coagulated rubber in the dryer may also be heated by a combination of microwave energy and hot air to dry the rubber, and the rubber may be dried to have a moisture content of less than 1.5%.

The process may also include stretching the coagulated rubber stream as it passes between the coagulator and the dryer, and preferably this coagulated rubber stream is stretched by increasing the speed at which the stream is conveyed to the dryer.

According to another aspect of the invention, an apparatus is provided for the continuous coagulation and drying of rubber latex. The apparatus included a coagulator, a first feeding apparatus to pass a stream of latex through the coagulator to form coagulated rubber, a primary heater operable to provide a combination of microwave energy and hot air to coagulate the latex stream passing through the coagulator, a dryer to receive the coagulated rubber stream from the coagulator, a second feeding apparatus to pass the coagulated rubber stream through the dryer, and a secondary heater to dry. the coagulated rubber passing through the dryer.

The secondary heater may also be operable to provide a combination of microwave energy and hot air to dry the rubber.

The apparatus may also include a stretch unit to stretch the coagulated rubber stream leaving the coagulator before it enters the dryer, and preferably the first and second feeding apparatus are conveyor belts.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

Figure 1:
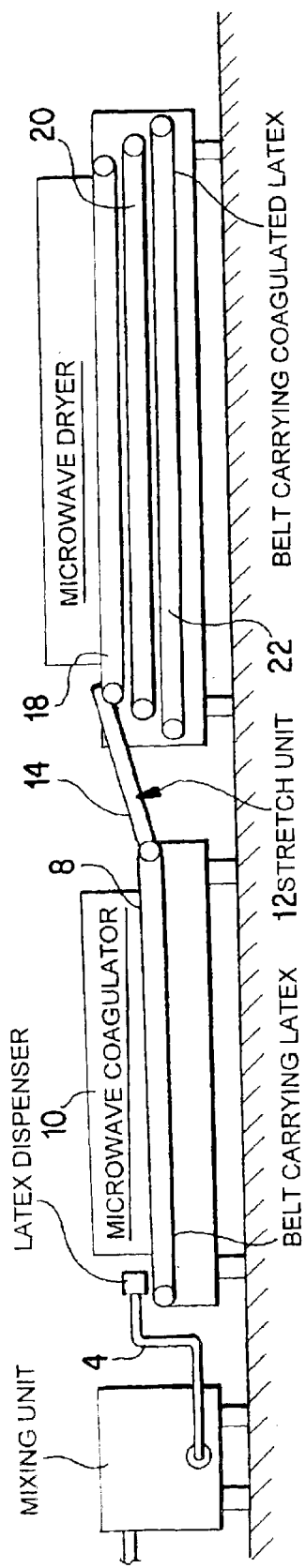
FIG. 1 is a side elevation of a plant for coagulating and drying rubber latex.
Figure 2:
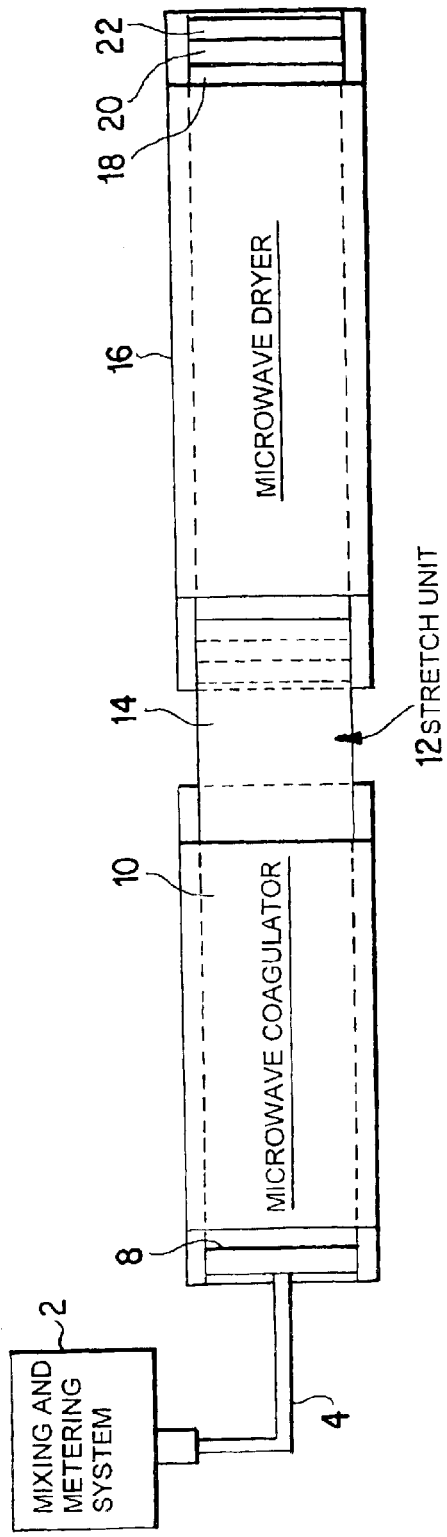
FIG. 2 is a plan view of the plant of FIG. 1.

Referring now to the drawings, the material from which the rubber is formed is a fully compounded natural rubber latex containing a chemical dispersion of sulphur, zinc oxide, accelerators, antioxidants, antidegradants and a heat sensitizing agent. This latex is prepared in a mixing and metering unit (2) and the prepared latex is fed through a feed pipe (4) and a dispenser (6) onto an endless conveyor belt (8) which is coated with polytetrafluoroethylene (PTFE) to prevent coagulated rubber from sticking to the belt. The feed of the latex onto the belt (8) is controlled to provide a uniform thickness of latex in the range form 1.0 mm to 15.0 mm across the full width of the conveyer belt (8).

The belt (8) feeds the latex through a coagulator (10) which produces a combination of microwave energy and a supply of hot air to raise the temperature of the latex to a level to cause the latex to coagulate. The coagulation temperature is normally in the range from 30° C. to 90° C. depending on the specific formulation of the latex used.

The coagulation is 12.5 meters in the length which includes a 1 meter long latex feed system at the inlet of the coagulator (10). The endless belt (8) extends around a drive pulley and a driven pulley located at the inlet and outlet of the coagulator (10) so that the belt (8) returns through the coagulator (10). The belt is dimensioned to support a latex produce width of 1.25 meters and the belt is located up to 1.0 meters from the floor of the coagulator (10). The belt specification and the support structure are designed so that the belt is flat and level over its complete length within plus or minus 0.1 mm. The belt drive system is designed to ensure correct and consistent tracking of the belt (8) and provision is made to allow any inclination of the belt from the horizontal to be adjusted on site.

The invention is, of course, not restricted to plant components of any specific size. For example, the width of the apparatus can be varied according to the required width of the product. The length of the coagulator (10) is determined by the required flow rate of the latex; the higher the required latex flow rate, the longer the coagulator (10) has to be.

A conventional liquid catch tray and a scraper (not shown) are fitted around the drive pulley to collect and remove uncoagulated latex from the belt. A conventional lightweight roller (not shown) is fitted at the outlet of the coagulator to assist in removal of uncoagulated latex from the belt (8). This roller is designed for easy removal to allow access for cleaning the catch tray and scraper. A belt cleaning unit is provided so that the belt (8) can be replaced without removing any other part of the apparatus. An illuminated viewing port is fitted to the coagulator so that the coagulation process can be examined.

A stretch unit (12) consists of an endless conveyor belt (14) coated with PTFE. The belt (14) is dimensioned to accommodate a product width of 1.25 meters. The belt (14) travels around a drive pulley and a driven pulley which are designed to ensure correct and consistent tracking of the belt. The invention is not restricted to plant components for handling a specific produce width.

A conventional pneumatically-operated nip roller (not shown) is located above the driven return roller of the belt (14).

In operation, the belt (14) of the stretch unit (12) is driven at a higher speed than the belt (8) of the coagulator (10) so as to increase the speed at which the coagulated rubber leaving the coagulator (10) is conveyed. This speed increase of the coagulated rubber stretches the rubber so as to increase the surface area of the rubber thereby reducing the time the rubber takes to dry.

The stretched rubber is then conveyed into a drying unit (16) containing three endless conveyor belts (18), (20) and (22) located one above the other. All three belts have an open mesh to improve the drying rate of the rubber, and are coated with PTFE. The three belts are dimensioned to accommodate a produce width of 1.25 meters, and the drying unit (16) is designed so that all three belts can be replaced without having to remove any other part of the drying unit.

The three belts (18), (20) and (22) each pass around their associated drive pulley and driven pulley, and the belt drive system is designed to ensure correct and consistent tracking of the belts.

The coagulated rubber leaving the stretch unit belt (14) passes onto the inlet of the upper drying unit belt (18) which travels in a clockwise direction to deposit rubber from its outlet end onto the inlet end of the intermediate belt (20) which travels in a counterclockwise direction to deposit the rubber from its own outlet and onto the inlet end of the lower belt (22) which travels in a clockwise direction. This lower belt (22) conveys the coagulated rubber to the outlet of the drying unit (16).

The drying unit (16) uses a combination of microwave energy and hot air in the belt triple-pass system to reduce the final moisture content of the coagulated rubber to less than 1.5%.

The drying belt (16) in this example of the invention is three pass, i.e., the coagulated rubber is passed in sequence over three belts (18), (20) and (22) located in series. The drying unit (16) could, however, have any odd number of belts in series. The important consideration is that the coagulated rubber is retained in the drying unit sufficiently long to dry the rubber to a required level.

The dispenser (6) is a fully welded construction using stainless steel to ensure that there is no rusting that can lead to contamination of the product.

To ensure that the dispenser (6) is easy to clean, all surfaces that come into contact with the latex are coated with polytetrafluoroethylene (PTFE) also known by the trademark (Teflon).

The dispenser (6) is set level across the width of the belt (8) on to which the latex is deposited. This has to be set up very accurately using a built-in leveling system to ensure that, together with the constant flow delivered via a metering system, the correct thickness of product is achieved.

The dispenser (6) is moved from the standby position to the ready position using a small compressed air cylinder or the like.

The design of the dispenser (6) ensures that there are minimum restrictions in the system to provide an even flow to the product. This design, along with the flow and levelness of the system, is essential in giving accurate control to the thickness of the product.

Microwave chokes are provided at both ends of the above units. These chokes are designed for a maximum product thickness of 150 mm but they are adjustable to suit a minimum product thickness of 1.5 mm. Microwave leakage detectors are fitted at both ends of each of the above units.

The recirculating hot air system of the coagulator (10) and the drying unit (16) is designed for automatic control at any temperature from ambient up to a maximum temperature of 100° C., and the warm-up time from ambient to maximum temperature will not exceed 15 minutes.

Should the system be capable of generating temperatures in excess of the required maximum, interlocks must then be provided to prevent this from taking place. The control of the recirculating hot air will be carried out by use of a variable speed fan. Distribution of airflow into the units must be such that it does not cause either the leading edge of the product to fall back upon itself or, specifically and of the utmost importance in the coagulator (10), a wave effect on the product surface. All units will be lagged such that the external temperature of an part of the units does not exceed 40° C.

All units will also be fitted with access doors to facilitate access for cleaning. These doors will be interlocked to shut down the unit in the event of someone entering the unit during operation, and to prevent the unit being started up unless all the doors are in position and locked. The interlocks will be wired for no auto-restart. In this embodiment of the invention the metal used will be stainless steel, grade 304 L. Product sensors are fitted and linked to the microwave power system to provide automatic power adjustment during the start-up and shutdown, or any other breaks in production.

The microwave heating process in the coagulator (10) has the following advantages:

(1) the temperature of the latex can be controlled with great accuracy, (2) the coagulation process time is significantly reduced as the microwave energy heats the water containing the rubber from within. In previously known processes the coagulation time could be up to several hours whereas in this process the coagulation time is less than five minutes, and (3) this process is energy-efficient when compared to previously known processes.

The microwave heating process in the drying unit (16) has similar advantages to that of the coagulator (10). The drying time in the drying unit (16) is less than 30 minutes compared to more than 15 hours in a previously known process.

The foregoing disclosure has been set forth merely to illustrate the invention and is not intended to be limiting. Since modifications of the disclosed embodiments incorporating the spirit and substance of the invention may occur to persons the spirit and substance of the invention may occur to persons skilled in the art, the invention should be construed to include everything within the scope of the appended claims and equivalents thereof.

What is claimed is:

1. A process for continuous coagulation and drying of rubber latex, comprising passing a stream of the latex through a coagulator to form a coagulated rubber stream, wherein a coagulation temperature in the coagulator is in the range from 30° C. to 90° C., introducing the coagulated rubber stream from the coagulator into a dryer downstream of the coagulator, and passing the coagulated rubber stream through the dryer to dry the rubber, in which the latex stream in the coagulator is heated by a combination of microwave energy and hot air.

2. A process as claimed in claim 1, wherein the latex stream entering the coagulator has a thickness in the range from 1.0 mm to 15.0 mm.

3. A process as claimed in claim 1, wherein the coagulated rubber in the dryer is heated by a combination of microwave energy and hot air.

4. A process as claimed in claim 1, wherein the rubber is dried to a moisture content of less than 1.5%.

5. A process as claimed in claim 1, wherein the latex stream speeds, rubber temperatures and microwave energy consumption are computer-controlled.

6. A process as claimed in claim 1, further including stretching the coagulated rubber stream passing between the coagulator and the dryer.

7. A process as claimed in claim 6, wherein the coagulated rubber steam is stretched by increasing its speed of conveyance to the dryer.

8. A process according to claim 1, wherein the latex stream entering the coagulator is carried on a conveyer belt.

* * * * *